United States Patent
Richard

(10) Patent No.: US 6,928,444 B2
(45) Date of Patent: *Aug. 9, 2005

(54) AUTOMATIC BACKUP/RECOVERY PROCESS

(75) Inventor: Bruno Richard, Crolles (FR)

(73) Assignee: Hewlett-Packard Development Company, L.P., Houston, TX (US)

(*) Notice: Subject to any disclaimer, the term of this patent is extended or adjusted under 35 U.S.C. 154(b) by 30 days.

This patent is subject to a terminal disclaimer.

(21) Appl. No.: 10/654,806

(22) Filed: Sep. 3, 2003

(65) Prior Publication Data

US 2004/0044707 A1 Mar. 4, 2004

Related U.S. Application Data

(62) Division of application No. 09/847,544, filed on May 2, 2001, now Pat. No. 6,728,711.

(30) Foreign Application Priority Data

Jun. 19, 2000 (EP) .......................................... 00410062

(51) Int. Cl.[7] .............................................. G06F 17/30
(52) U.S. Cl. ........................................ 707/10; 707/204
(58) Field of Search ................................... 707/204, 10

(56) References Cited

U.S. PATENT DOCUMENTS

| | | | |
|---|---|---|---|
| 5,469,573 A | 11/1995 | McGill et al. | 717/127 |
| 5,652,868 A | 7/1997 | Williams | 703/23 |
| 5,659,614 A | 8/1997 | Bailey, III | 380/4 |
| 5,771,354 A | 6/1998 | Crawford | 709/229 |
| 5,852,713 A | 12/1998 | Shannon | 714/6 |
| 5,935,212 A | 8/1999 | Kalajan et al. | 709/228 |
| 6,038,665 A * | 3/2000 | Bolt et al. | 713/176 |
| 6,292,790 B1 * | 9/2001 | Krahn et al. | 705/50 |
| 6,317,845 B1 | 11/2001 | Meyer et al. | 714/23 |
| 6,367,029 B1 | 4/2002 | Mayhead et al. | 714/2 |
| 6,751,634 B1 * | 6/2004 | Judd | 707/200 |

FOREIGN PATENT DOCUMENTS

EP 0 978 785 A1 2/2000

OTHER PUBLICATIONS

IBM technical Disclosure Bulletin, Dec. 1999, UK, "Automated Backup System for HTML–Based Help Systems," Issue No. 428, p. No. 1657.*

* cited by examiner

Primary Examiner—Jack M. Choules

(57) ABSTRACT

A backup procedure which performs a systematic analysis of the different elements of the configuration, for the purpose of transforming them into a corresponding set of backup objects. Backup objects include files, directories, volume names or labels, security attributes (Access Control Lists in Windows NT), as well as OS-specific markers which are dependent on a specific file, such as, for instance an entry in the FAT for MS-DOS. Each backup object is being systematically analysed and sent to a remote server with its identification, attributes, signature and content the backup process takes advantage of the HyperText Transfer Protocol (HTTP) and each backup object is being encapsulated within a HTTP or HTTPS POST or PUT request which is transmitted to a remote server. The backup procedure is associated with a process for automatically creating a bootable CDROM having a bootable partition comprising a set of files systems driver for controlling different file system types, such as NTFS, FAT, FAT32, i-NODE, but also CDFS, and an executable file for carrying out the automatic re-establishment of the backup objects corresponding to a user's configuration.

3 Claims, 5 Drawing Sheets

AUTOMATIC BACKUP/RECOVERY PROCESS

CROSS-REFERENCE TO RELATED APPLICATIONS

This patent application is a divisional application of U.S. Ser. No. 09/847,544 filed on May 2, 2001, now U.S. Pat. No. 6,728,711 B2 which is incorporated herein by reference.

TECHNICAL FIELD OF THE INVENTION

The invention relates to computer systems and more particularly to a process for achieving an automatic backup and restore of a pre-configuration of a computer system.

BACKGROUND ART

The restoration of a hard disk drive, or a partition of a hard disk drive, appears to be a generally complex and tricky procedure, which involves a great number of manual operations. When a hard disk drive suffers a breakdown and needs to be replaced, the user is compelled to enter into a laborious procedure for the purpose of re-establishing the configuration of his machine. He generally has to partition the new hard disk, to format the different partitions, to install the Operating System (OS) within the active partition, be it Windows (a trademark of Microsoft Corp.), Linux or OS/2 (a trademark of IBM Corp.) Once the Operating system has been installed, for instance Windows 98, the user may then take advantage of the internal backup/restore software facility which is incorporated in the OS for the purpose of restoring his data files. In the case of a Windows NT operating system, the user must then re-establish the Network Domain Controller (NDC) and re-trust the machine. When all the data files are restored, the will be completed by the restoring of the appropriate security settings (including the Access Control Lists which contain the list of users having permission to access the files) in the case of the UNIX, Windows NT, or OS/2 operating systems. It is clear that all those manual operations may be well beyond the normal possibilities of the ordinary user.

If the user has a stand-alone computer, he may take advantage of some type of hard disk image software which has revealed to be of much interest for taking and storing an image of a given partition. Such programs, marketed for instance by PowerQuest™ and NORTON™ under the commercial names of Drive image and Ghost, respectively, make a systematic copy of the contents of the clusters of a given partition. The copy of the partition and its restoration are substantially facilitated, since the user and, and the restoration of restore is thus facilitated and the user may get rid of all the manual steps which were mentioned above.

The image creation technique shows to be very useful for restoring an image of a given partition, but not without the cost of some disadvantages. A first drawback clearly results from the fact that, in that approach, a whole partition needs to be copied in one file, thus requiring a substantial storage media for each backup operation. No incremental backup is permitted and there is a need for a substantial amount of storage capacity, even between two successive backup procedures. Further, since the image taking procedure is handled under the DOS operating system, the computer is rendered no longer available for other tasks during a non negligible period. At last, the stand-alone backup procedure reveals to be not well adapted to a corporate environment involving a great number of different computers which are connected in a network. In that situation, the "disk image" approach would require as many image files—each one of a considerable size—as there are different machines comprised in the network. Generally speaking, in a corporate environment, an Information Technology (IT) manager provides the user support and, clearly, an set of individual backup images of all the machines is not feasible. The IT manager generally creates a so-called "Gold" or "Master" image of a typical configuration which contains the Operation System with the appropriate drivers. The gold image can then be used for re-creating, when required, an image of the configuration in one machine, and the restoration of the configuration can then be completed with the reestablishment of the user's files. In the case-of Windows NT again, the machine needs still to be retrusted and the Security Identifier (SID) be redefined. Although the gold image shows to be very useful and substantially facilitates the work of the IT manager when the latter has to re-establish the configuration on an individual machine connected to a network, it appears that manual operations still need to be performed, or at least by a skilled user, for the sake of re-establishing the entire configuration of the machine. At least, the transfer of the image from the "gold" or "master" disk for the purpose of re-establishing a remote access to a backup server implies a manual intervention of the IT manager and that, even when the crash does not result from any hardware breakdown, what is not so rare in the practice of the operating systems. Inevitably, the intervention of the IT manager substantially increases the costs of the computers maintenance.

Therefore there is still a need for a solution which permits to largely automate the backup and restore procedure so that it becomes directly applicable for a large number of operating systems, even when configured in a network or corporate environment, and that without requiring a skilled staff or an IT professional.

It is further desirable that the backup procedure can even take advantage of an Internet network so as to render the procedure fully transparent to the user who may continue to work with his machine. It is additionally expected that the backup procedure is not disturbed by the existence of the firewall arrangements which a company or a private organisation may arrange for securing its network.

SUMMARY OF THE INVENTION

It is an object of the present invention to provide an automated backup and restoration procedure which can be used by non experienced users, whatever complex is the environment in which the machine is being used.

It is another object of the present invention to provide an automatic backup/restore procedure which is well adapted to a wide range of different operating systems and which can be easily used through the Internet network or Intranet network, even when a firewall system is being arranged.

Basically, there is provided a backup procedure which performs a systematic analysis of the different elements of the configuration, for the purpose of transforming them into a corresponding set of backup objects. Backup objects include files, directories, volume names or labels, security attributes (Access Control Lists in Windows NT), as well as OS-specific markers which are dependent on a specific file, such as, for instance an entry in the FAT for MS-DOS. Each backup object is being systematically analysed and sent to a remote server with is identification, attributes, signature and content.

In one embodiment, the backup process takes advantage of the HyperText Transfer Protocol (HTTP) and each backup object is being encapsulated within a HTTP or HTTPS POST or PUT request which is transmitted to a remote server. This ensures the possibility to easily backup a system contained within an Intranet network, and that even if a firewall mechanism is being arranged within that Intranet. In particular, there is no need in modifying the actual settings of the firewall arrangement and the backup procedure is immediately applicable.

More precisely, the backup procedure involves the following steps:

getting from said server a remote data set of the objects, including the identifier, attributes and signatures, which are already stored within the data base 4;

computing a local data set of the objects which are representative of the user's configuration;

transmitting to said server the objects identified in said local data set which are not identified within said remote data set, or which have not the same signature.

Since only the objects which are identified as being new or which have changed since the last backup procedure are being transmitted through the Internet network, the process presents the advantage of an incremental process, thereby minimising the amount of data which are being exchanged between two successive backup operations.

The backup procedure is associated with a process for automatically creating at least one CDROM medium complying with the EL TORITO format. For this purpose, a CDROM is created with a first bootable image disk which contains a set of system files drivers for allowing the control of different types of system files. In addition, the bootable partition comprises an executable file which servers as the shell after the drivers have been loaded, and which handles the process of the restoration procedure.

In one particular embodiment, additional CDROM are created for the purpose of storing large size partitions.

Once created upon request by the user, the bootable CDROM can be directly used for automatically re-establishing a given configuration. To achieve this the user has only to incorporate the CDROM within his drive and power-on the computer so that the latter starts on the CDROM. When the bootable CDROM is loaded by the users, an automatic reconfiguration process is automatically launched under the control of the above mentioned executable file, which execution involves the step of:

requesting a user id associated with a password;

computing a hash function with said user id and said password;

aborting said process if said computed hash function appears to be different to a value stored on the CDROM;

decrypting a table contained on said CDROM by means of said password, comprising the lists of backup objects, including the identifier, the attributes and the original names.

decrypting a data set of backup objects which are loaded and encrypted on said CDROM by means of said password;

extracting the identification of the operating system to reestablish, and correspondingly re-establishing settings dependent to the OS for ensuring a proper start of the OS at the next booting of the machine.

In one particular embodiment, the bootable image file of the EL TORITO CDROM contains the CDFS, as well as the HPFS, NTFS, FAT, FAT32 and i-NODE system files, or a subset of the latter. Therefore, there is provided a process for allowing a recovery of a wide set of operating systems, and a wide number of different user's configuration. Therefore, the same bootable image file may be used for a wide range of different configurations and backups.

It therefore appears that the restoration of the configuration is immediate and does not need any preliminary restoration steps. In particular, there is no need to re-establish any remote access with a server prior to restoring the user's configuration. With the restoration process of the invention, the restoration is immediate and directly re-establishes the user's configuration.

Although the backup and restore process are adapted to a corporate environment, it can also be used in a stand-alone environment, and particularly in associated with a CDROM writing software. It can be used for automatically storing a local image of the backup objects corresponding to his configuration, for the purpose of producing, upon request, a bootable CDROM which may automatically re-establish the image when the user wishes so.

When the backup objects have been saved, the process controls the CDROM writer so that it arranges a bootable partition comprising at least a basic kernel operating system as well as a set of drivers allowing the access to CDFS, as well as NTFS, FAT, FAT32, HPFS or i-NODE file systems, or a subset of those. The bootable partition also comprises an executable recovery file which is automatically started after the files systems drivers are loaded. In addition to the bootable image disk, an ISO image comprises a first file having a hash function derived from the user and the password; a second file which has an encrypted table of the data set of the backup objects, including the identifier, the attributes and the original file names, then followed by an encrypted version of the different backup objects. After having checked the authenticity of the user, the process carried by the executable recovery file causes the decryption of the data set tables, and thus re-establishes the different backup objects with the corresponding attributes. The process is then finalised by the proper settings of OS specific settings for ensuring a proper start of the OS at the next booting of the computer.

DESCRIPTION OF THE DRAWINGS

An embodiment of the invention will now be described, by way of example only, with reference to the accompanying drawings, wherein.

DESCRIPTION OF THE PREFERRED EMBODIMENT OF THE INVENTION

Figure 1:
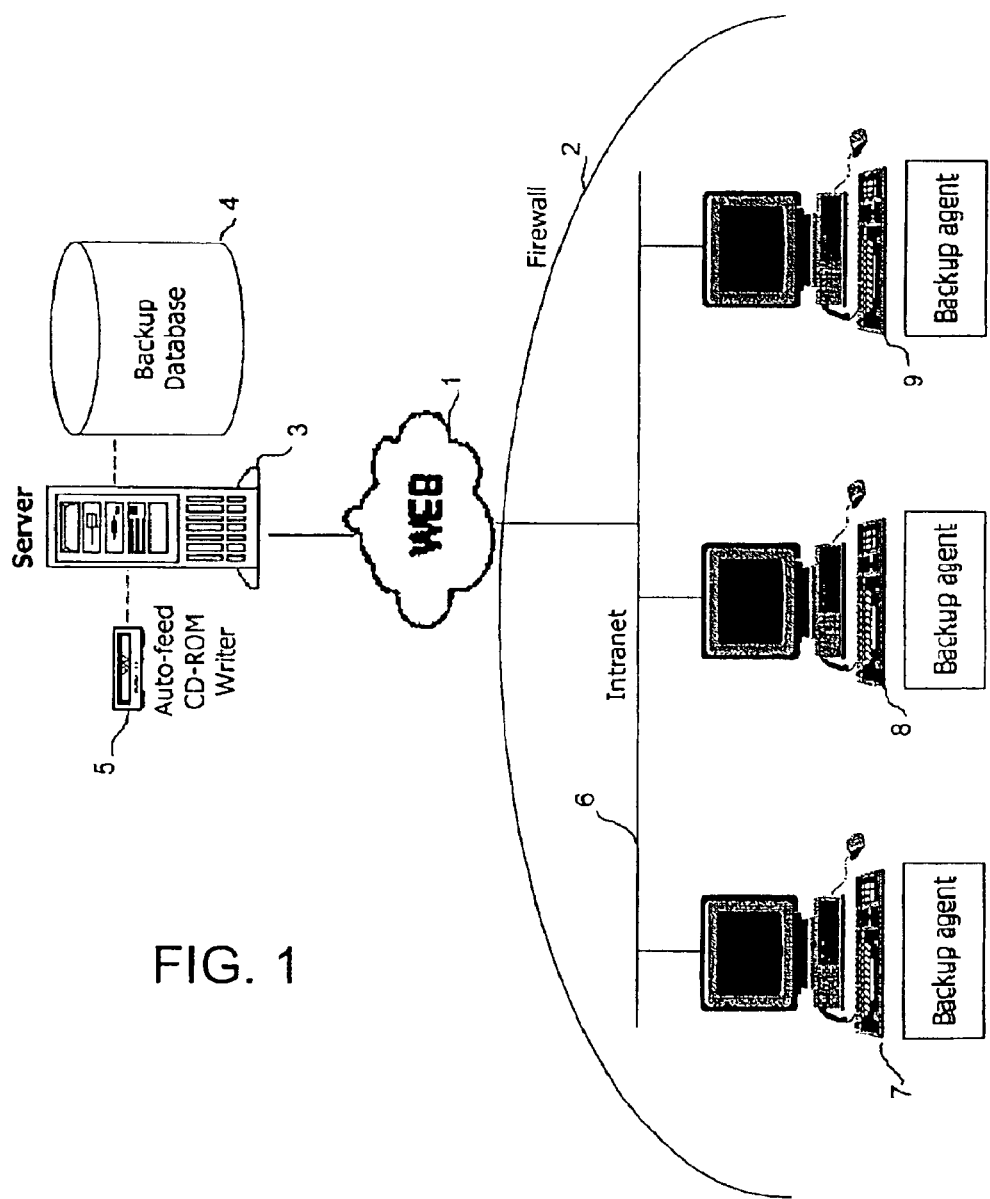
FIG. 1 illustrates the architecture of a computer which operates in a corporate environment.

With respect to FIG. 1 there is shown the architecture of a corporate environment which can typically take advantage of the backup and restore procedure which will be described below. A set of computer systems 7, 8 and 9 are connected to an Intranet network 6 which can communicate to an Internet network 1 (WEB). A firewall arrangement 2 may be disposed for securing the exchange of communication between the Internet network 1 and the Intranet 6. The organisation of a firewall is generally based on the use of two distinctive servers as known by the skilled man. A first server is used for collecting the information received from the Internet, and which is to be forwarded inside the Intranet and, conversely, a second server is used for receiving all the requests coming from the Intranet, which are to be forwarded outside the Intranet. The arrangement of a firewall is well known to the skilled man and will be not be further described with more details.

Attached to the Internet network, is a server 3 which is associated to a database 4 and has automatic CDROM writing equipment 5, for instance an autofeed CDROM writer 5.

Each computer 7–9 is fitted with an backup agent facility for handling the procedures which will be described below. For the purpose of achieving an effective backup of the configuration of the user's machine, each agent performs an analysis of the system and the different volumes contained within the system. A volume is considered to be a part of a computer disk, a set of disks or partitions which are to be saved by the process which will be described hereinafter with details.

Each volume for which a backup procedure is considered is analysed in terms of backup objects. Backup objects correspond to elements which are systematically analysed and which are transformed into a corresponding stored object—uniquely identified—through the backup process handled by the backup agent. Backup objects include files, directories, volume names or labels, locks between files, but also Operating System specific markers which are dependent on a specific file. Such a marker may be, for instance, an entry in the FAT for MS-DOS. Backup objects also include security attributes, such as the Access Control Lists on Windows NT, LINUX but also IBM OS/2, which define the users receiving permission to access to considered files.

For the purpose of achieving an effective backup procedure, each backup object is considered in relation with an identification, with a content, with attributes and with a signature.

Object identification. Each backup object has an object identification which is automatically assigned by the process for the purpose of allowing an unique identification of the considered backup object. In the case of a file or a directory, the object identification is the file or directory name, including the full path identification. In the case of a label, the object identification takes the form of the label, once preceded, for instance, by the string "% label %". For a volume whose label would be "MAIN" for instance, the following string "% label % MAIN" would be assigned as the object identification.

Object content. The object content consists of the actual value of the backup object, which is to be saved by the backup procedure, and restored if necessary. In the case of a backup object corresponding to a file, the object content is the file content. For a directory or a volume label, the object content would be empty. For security attributes, the object would be the list of access rights and users having those rights.

Object attributes. The object attributes are the element which are specific to the file, which are not inherently considered as object content. For instance, the date of creation of a file, or the read/write settings are considered as attributes to that file.

Object signature. The object signature of a backup object is a string which is a function of the backup object attributes and content. An object signature is such that it can not be reversed, i.e. given a random object signature, it is not theoretically possible to compute a backup object whose object attributes and object content translate to the considered object signature. The man skilled in the art is aware of the use of non-reversible signature algorithms, for instance the MD5 algorithm, for achieving that purpose.

The backup process which is described below is based on the successive transmission of the backup objects to the server 3 through the network, and particularly via the firewall 2. More particularly, each object is transmitted with its object identification, its object attributes, the object signature and the object content. Once transmitted and received by server 3, the objects are stored within database 4 in order to form a backup data set, which comprises the description of all the files, the attributes, the directories, and labels that make up a saved volume. Each stored object consists of an image of a backup object of the original configuration of said volume, and which is to be safeguarded within the database 4. As it will be shown below, by using the identification, the attributes and the signature are used for uniquely comparing a stored object with a backup object. Additionally, the contents is used for rebuilding an object which is saved from a previous backup.

Practically, it has appeared that the transmission of the backup objects may take a substantial advantage from the FTP and particularly from the HyperText Transfer Protocol (HTTP)—or its secured version HTTPs—. Such an arrangement entails two substantial advantages. The first one results in a simpler design of the agent component which can easily take support from the HTTP protocol and transmit, possibly in a secured fashion, the different backup objects through the Intranet and internet network, up to the server 3. Additionally, by encapsulating the different backup objects which were defined above into HTTP POST requests, the backup objects are ensured to be conveyed throughout the network, and even when a firewall system has been arranged in order to secure the Intranet. In particular, no adaptation of the different settings of a pre-existing firewall system is necessary and the backup process can be immediately executed and applied, at no additional cost. This is a substantial advantage as the skilled man is aware that, in most cases, the adaptation of an existing firewall appears to be a complex and costly operation. The process which will be described now simply achieves an effective backup procedure without specific adaptation of the pre-existing network configuration.

Figure 2:
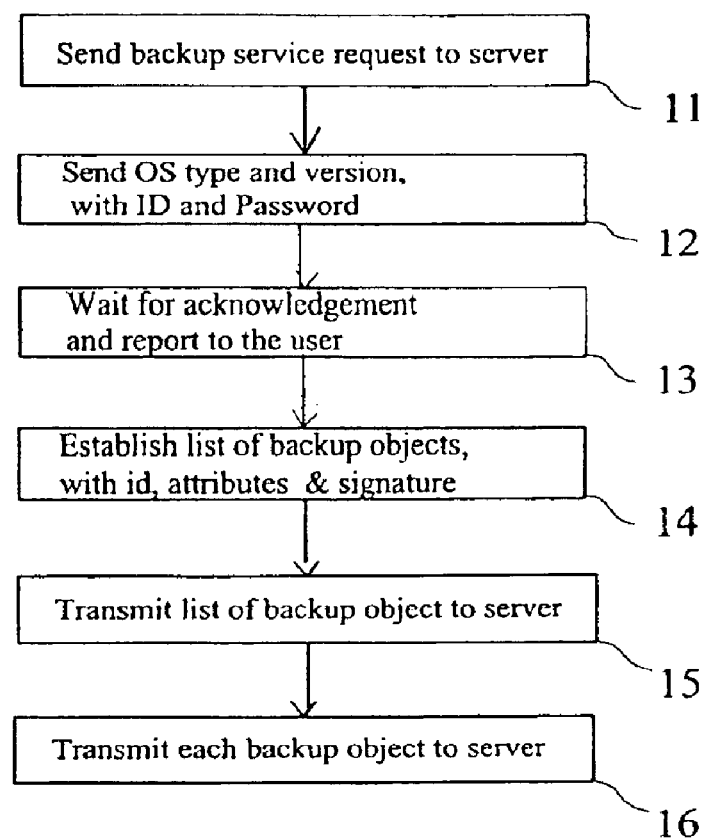
FIG. 2 is a flow chart illustrating the initialisation of the backup procedure.

With respect to FIG. 2 there will be now described the initialisation procedure of the backup process. The process starts with a step 11 which corresponds to the request by the user of the automatic backup service. In one embodiment, the user's computer is fitted with the backup agent and an icon on the Desk is available for the user for the purpose of launching the subscription procedure. In another embodiment, the agent is downloaded from backup server 3 when the user enters the URL of that server in his browser. When the backup agent is launched, the latter prompts the user to enter a user identifier accompanied by a password.

In step 12, the backup agent initiates a remote access to the server 3 and prepares a HTTP POST or PUT request, which is transmitted to backup server 3, with a string containing the identification of the Operating System being considered, as well as the user identifier and the password. It can be particularly advantageous to secure the transmission of the user identifier and the password by using the secured version of the HTTP protocol.

Once the user id and the password have been transmitted to backup server 3, the backup agent waits for a acknowledgement from the server before reporting that information to the user, step 13. In the particular case where the identifier has already been assigned to another user, the registration procedure is aborted and the user may restart it by submitting another identifier and password. In one embodiment, it could be useful to automatically assign the id to the client by means of a random mechanism. In that case, the user identifier, once assigned, can be stored within the system.

In step 14, the backup agent performs a systematic analysis of the backup objects existing in the user's configuration, and establishes a list of those which is representative of configuration, including the identification, the attributes, and the signature. This is achieved for each backup object, be it a file, a directory, a volume name or label, an OS-specific marker etc . . . Once it is established, the list of backup objects is transmitted to the server 3, once encapsulated within a HTTP POST, as shown in step 15 of FIG. 2. In one embodiment, the list of backup objects, also referred to as a data set of objects, can be transmitted via a eXtended Markup Language (XML) file containing that information.

In step 16, the backup agent enters a loop and transmits each backup object which was identified before, and reported within the above mentioned list, to the server 3. For each backup object, a HTTP POST is prepared to include the identifier, the content, the attribute and the signature.

The initialisation procedure then completes with the transmission of the last backup object to the server.

Figure 3:
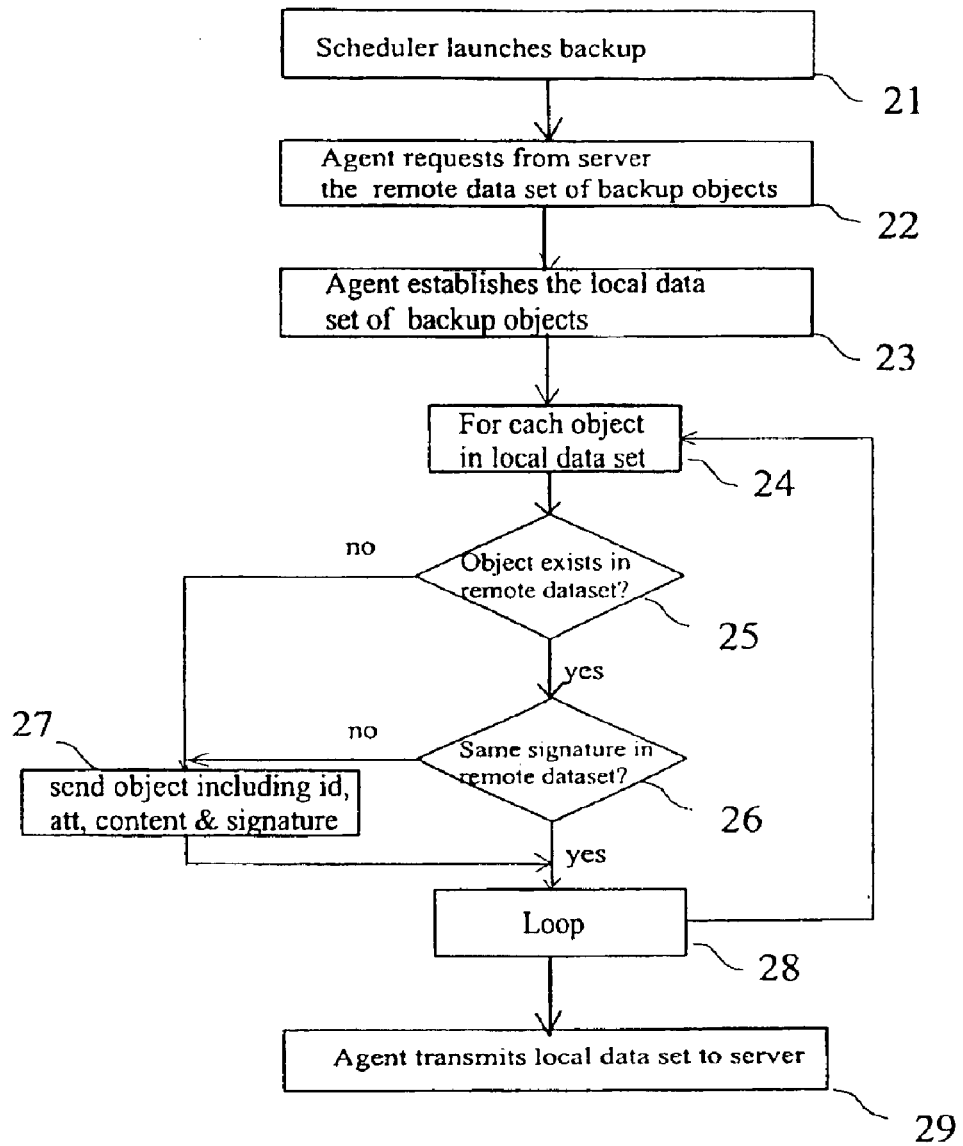
FIG. 3 is a flow chart of the recurrent backup procedure which the backup agent executes on the user's machine.

With respect to FIG. 3, there will be now described the backup procedure which is regularly executed by backup agent for the purpose of updating the data set of the backup objects contained within database 4.

The process is initiated with step 21. This can be performed by means of a system scheduler mechanism, such as the Sleep function which is known in the Windows NT operating system. In another embodiment, it will be possible to start the backup upon the request from the user.

In step 22, the agent initiates a HTTP get request for the purpose of getting a representation of the remote data set of the backup objects which are stored within the database 4. In one embodiment, a XML file may be received which contains a table with the data set or list of the backup objects, including the identifiers, the attributes and the signatures. While this step is not absolutely necessary, since it is possible to keep a local image of the data set within the users machine, it has shown to be of much interest to recollect the remote data set which is actually stored within the backup server.

In step 23, the Agent performs a local analysis of the user's configuration and identifies all the backup objects which are representative of that configuration. It then establishes a local data set of backup objects, including the identifier, the attributes and the signatures. It should be noticed that, for the purpose of computing the signature, the agent may create a copy of the considered object, after having locked the latter.

In step 24, the Agent then enters into a loop for the purpose of processing each backup object which has been identified within the local data set of backup objects.

In step 25, the process determines whether the considered object has the same identification on the remote data set transmitted by the server 3.

If the answer is yes, then the process checks in step 26 whether the signature of the considered backup object appears to be the same than that which is reported in the remote data set. If this is the case, the considered object appears to be unmodified, and the process then proceeds with step 28 which loops again to step 24 for processing the next backup object within the list of the local data set.

If the tests of step 25 or 26 have failed, the process proceeds with the transmission of the considered backup object to the server 3 in step 27. This is achieved by means of the construction of an appropriate HTTP s POST request with the considered object, including the identifier, the attribute, the contents and the signature. It should be noticed that, for the purpose of computing the signature of an object and processing it, the backup agent may advantageously create a local copy of the considered object, once it has been locked. As soon as the local copy is made, the original object can then be unlocked and the Agent may compute the signature on the local copy. This ensures that the considered object does not remain locked too long.

In the preferred embodiment of the invention, the backup agent is fitted with means for processing the compound files for the purpose of extracting from those the different objects and computing their signatures for the purpose of processing them as explained above. This permits to process and transmit, when necessary, the individual components of the compound files, for the purpose of reducing the amount of data to be transmitted through the network. As known by the skilled man, the compound files include .avi, .wav, .riff, zip files. In one embodiment, the backup technique may further use differential and compression techniques for the purpose of reducing the volume of the data to be transmitted to the server.

It appears that the backup procedure which was described above takes a great advantage of the HTTP protocol which is used for successively transmitting the different backup objects forming a user's configuration. The design of the backup agent appears to be substantially simplified since it is that protocol, and more precisely its secured version, which handles the main parts of the transmission process. Additionally, since the HTTP protocol is well received by the firewall mechanisms which the IT Manager may arranged for securing a network, the backup procedure is easily applicable within a corporate organisation, and an Intranet network.

When all the backup objects which are reported in the local data set have been processed, the loop completes and the backup Agent then transmits to server 3 the local data set which was computed in step 23. The server 3 receives that local data set and then launches a loop for processing all the objects contained within the remote data set. For each object which is identified within the remote set of data, the server checks whether the considered identification exists in the local data set, in which case the process loops back to the next object identified within the remote data set. However, if the object appears to be no longer reported within the local data set received from the backup agent, the server erases the latter from the remote data set and deletes the contents of that object within the database 4.

It will be now described the process for automatically creating, upon request from the user, an automatic CDROM which has a booting partition for the purpose of automatically restoring the different backup objects representative of a user's configuration.

Figure 4:
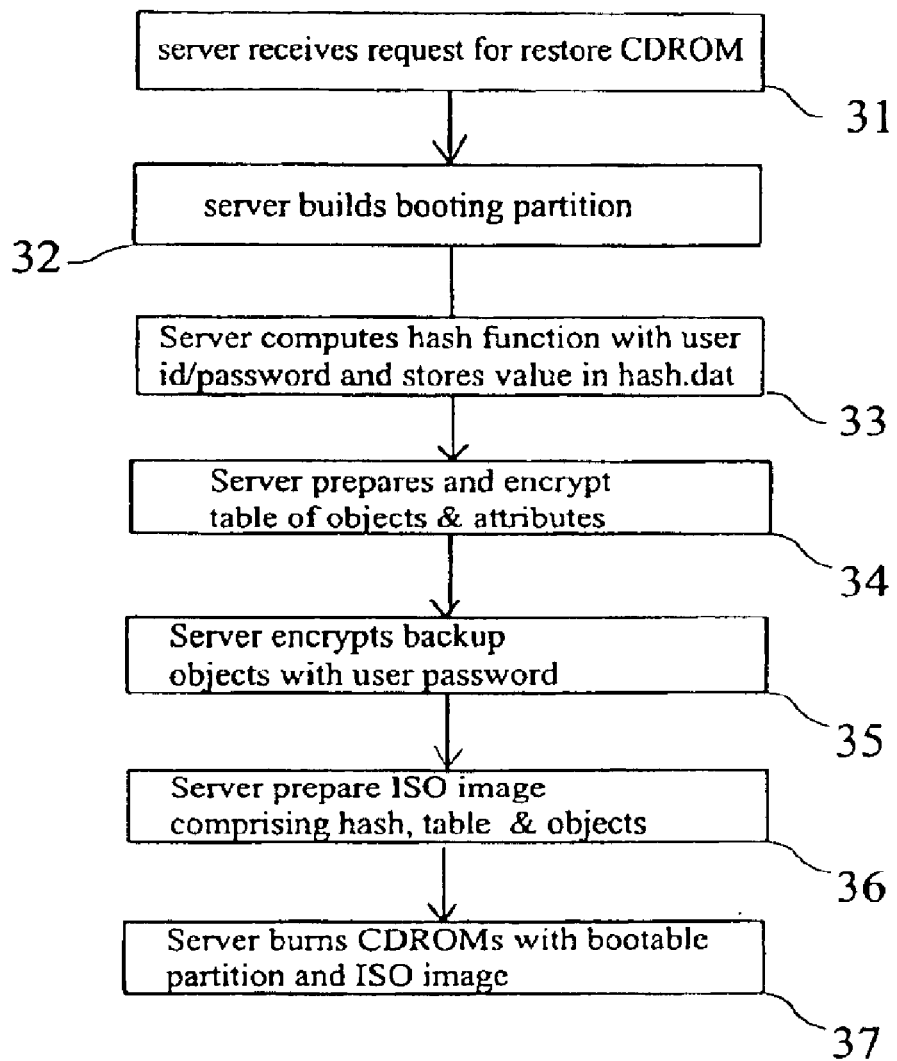
FIG. 4 is a flow chart showing the process for creating the recovery CDROM.
Figure 5:
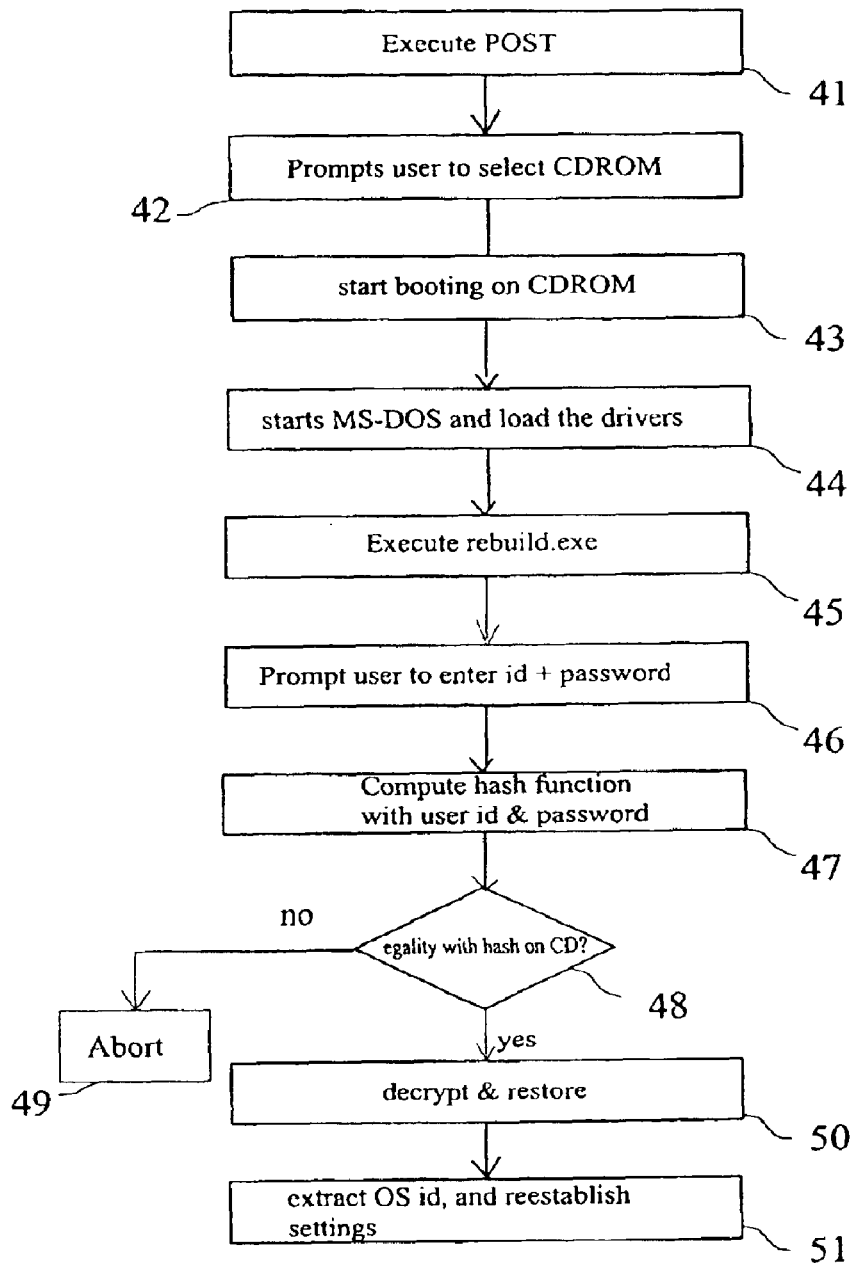
FIG. 5 illustrates the process which is executed when the recovery CDROM is being introduced within the CDROM drive of a computer.

The creation of the CDROM is achieved by means of the following steps, as illustrated in FIG. 4.

In step 31, the backup server 31 receives a request from a user for a delivery of a reconfiguration CDROM. In one embodiment, the user's request may take the form of a remote access to server 3, from any computer, or by electronic mail which is received by an automatic mailbox.

In step 32, the backup server builds an CDROM image for the purpose of preparing the burning of a CDROM complying with the improved version of the Yellow Book, known as the EL TORITO format designed by IBM Corp. and Phoenix Corp., and particularly the single boot image configuration. The server prepares the construction of a boot record volume, i.e. a bootable disk image or booting partition of 1.44 Mbyte maximum, which is associated with a supplementary ISO image track. The booting partition is arranged to contain a set of file systems, and particularly the File Allocation Table (FAT, FAT.sys drivers), the FAT32 (FAT32.sys drivers), the CD File System (CDFS.sys drivers), N . . . T . . . File System (NTFS.sys drivers), i-node file system and, possibly, HPFS if required. The association of the CD file system, and the different file systems used for hard disk drives, or a subset of those, allows to access to different disk drives, including Windows 9x, Windows NT, Linux, and OS/2. The bootable partition or bootstrap further comprises the dos kernel, for instance, that is to say the io.sys, the msdos.sys, the config.sys. In addition to the basic msdos kernal, the bootable partition comprises an executable file, a so-called rebuild.exe which is incorporated within the diskette image, and which will be used for the msdos shell. In particularly, it should be noticed that the command.com file is not introduced within the bootstrap, for the purpose of avoiding that the user may take the control of the automatic process once the CDROM is loaded within a system.

In step 33, the server extracts the user identifier and the password and computes a hash function of the user id and the user password. This is used for creating a hash file—so called hash.dat—which will be contained within the CDROM image track.

In step 34, the server constructs a data set table—a so-called objtab.dat file—comprising the list of the backup objects which represent a given user configuration, as well as the attributes of the latter including the access control lists, encrypted in accordance with the hash function computed in step 33. More particularly, for each backup object, the table includes the identifier of the object, the attributes, and the original name of the considered object, i.e. a 256 bytes, 128 bytes or 8 bytes in according to the considered OS to be re-established. The data set of backup object is encrypted by means of the hash function computed in step 33.

In step 35, the server encrypts by means of the hash functions the different backup objects which are identified in the table of step 34. If the data set appears to require a storage media which is beyond the capacity of a CDROM, the server 3 arranges the organisation of different subsets of backup objects for the purpose of preparing ISO image tracks.

In step 36, the server aggregates the hash file, the data set table encrypted and the different backup object, also encrypted in a similar way than the table, for the purpose of constructing an ISO image track which will be associated to the bootable partition which was prepared in step 32.

In step 37, the backup server controls the auto-feed CDROM writer device 5 for the purpose of creating one or more CDROM for recovering the user's configuration.

It appears that the arrangement which is described above, and particularly the bootable partition of the CDROM, presents the advantage of being independent of both the user's configuration, and the user's current backup. Therefore, once designed, the same bootstrap may be used for different users, and different corporate environment, for the purpose of re-establishing a wide set of different disk drives, including FAT, FAT32, NTFS etc . . . Once created, the same image may be introduced within the different CDROM which the backup server may need to create in accordance with the users requests, what ensures the possibility to widely automate the CDROM creation process.

While the process has been described with the building of a bootable partition based on the DOS kernel, it should be noticed that it may be advantageous to use another OS kernel, for instance LINUX for the purpose of accessing the hard disk drivers of the user's machine, during the restoration of the latter, and launching the rebuild.exe executable file.

It will now be described the process which is executed when the user incorporates the CDROM prepared by the server 3 into the CDROM drive.

In step 41, the process performs the Power-On-Self-Test (POST) after the powering of the machine. Those are well known to the skilled man and will not be further developed.

In step 42, the BIOS prompts the user to choose whether to boot on the CDROM or on the C: drive.

If the user selects the CDROM, the process then proceeds with the booting on the booting partition in step 43. This is achieved, as known by the skilled man, thanks to the BIOS extensions and the INT13 mechanism. The BIOS interprets the contents of the booting partition of the CDROM as being that of a floppy disk, what permits the booting process to proceed with the contents of the booting partition.

The basic MS-DOS kernel is then started in step 44, and the different drivers are loaded within the memory. In addition several drivers are loaded to enable access to CDFS media, ie the CDROM read access, as well as the NTFS, the FAT, the FAT32 and i-node, or a subset of those in accordance with the instructions existing in the config.sys file.

In step 45, the config.sys file causes the execution of the additional rebuild.exe executable file. As explained above, the rebuild.exe executable file is used for the msdos shell, what means that it is the first program to be run after the drivers are loaded at the startup. This is an important aspect for securing the process and avoiding any malicious operation from a non authorised user.

In step 46, the process prompts the user to enter the id and the password.

The values entered are used for computing a hash function in step 47 which can then be compared, in step 48, to the value stored within the hash.dat file on the CDROM.

If the two values are not equal, then the recovery process is aborted in step 49.

Conversely, if the value entered by the user matches the id and the password once hashed, the process presumes that the user is authorised to reinstall a backup configuration, and the process proceeds with step 50 where the different objects are successively restored, with the appropriate attributes.

In step 51, the process extracts from the objtab.dat table contained within the ISO image of the CDROM the identification of the operating system being used, as well as the version. It then re-establishes a set of parameters for the purpose of ensuring a correct starting of the operating system at the next booting of the machine.

It should be therefore noticed that those operations are advantageously performed during the reestablishment of the configuration, and that automatically by the executable rebuild.exe file. That permits to avoid the need of any manual intervention from a IT manager or a skilled professional for ensuring the completing of the recovery process.

In the case of a DOS system, the process particularly controls the first, second and fourth entry of the File Allocation Table, so as to permit a correct starting of the computer on the newly re-established partition. More particularly, the first entry of the FAT refers to the io.sys file, while the second refers to the msdos.sys file, and the fourth to config.sys file . . .

To access the files, rebuild.exe will manipulate the FAT directly. This means that for each file or directory creation, deletion or modification, it will allocate the disk space accordingly and properly set the FAT entries. In the case of the FAT32 or NTFS file systems, these operations will be done by the appropriate media access driver, which is the necessary layer that provides rebuild.exe with an access to file system objects (files, directories, labels, . . . ) for reading, writing, deleting, modifying them as well as changing their attributes.

When the WIN 95 system has to be reconfigured, the process causes a deviation in the checksum computation of the swap file. To prevent such problem, the swap file (commonly named win386.swp) will be blanked i.e., a file with the same name and attributes will be created, but it will contain only zeros.

This ensures that, at the next start of the computer, the WIN 95 operating system correctly operates.

When the WINDOWS NT operating system has to be configured, the rebuild.exe program completes the configuration process with the proper settings of the following parameters for the purpose of a correct start at the next booting process of the user's machine. In particular, when recovering the files, the process creates blank files for Windows NT specific files which are inherently not "lockable" for the purpose of backing them up. This is typically the case for the swap file, which is too dynamic to be locked or even duplicated in a consistent way, hence which backup copy is not relevant at restore time.

It therefore appears that the procedure which was described above, when associated with the backup process which was also described, permits to automatically re-establish a user's configuration without requiring the involvement of a skilled staff or IT support. This is very advantageous and could even be incorporated within a CDROM writing software as an additional facility for re-establishing the user's configuration. To achieve this the CDROM writing software comprises means for automatically establishing the data set of the backup objects and for creating the CDROM containing the sets when the user finds appropriate to burn one CDROM. The latter will permit an easy reconfiguration of his machine when necessary.

What is claimed is:

1. Backup process for a computer system having a connection to an Internet or Intranet network, said process involving:

identifying a set of backup objects which are representative of the configuration of the computer system; said backup objects having identifier, attributes, contents and signature; and periodically transmitting or upon request of the user, to a server, said backup objects which are encapsulated in HyperText Transfer Protocol (HTTP) or HTTPS POST requests, said POST request including said identifier, said content, said attribute and said signature.

2. Backup process according to claim 1 wherein said backup objects are representative of the files, directories, volume names or labels, security attributes (Access Control Lists in Windows NT), as well as OS-specific markers which are dependent on a specific file, and that said process involves the steps of:

getting from a server a remote data set of the objects, including the identifier, attributes and signatures, which are already stored within a data base;

computing a local data set of the objects which are representative of a user's configuration; and transmitting to said server the objects identified in said local data set which are not identified within said remote data set, or which have not the same signature.

3. Backup process according to claim 2 wherein computing the signature of an object involves the step of locking said object, making a local copy of said object, un-locking said object, and computing said signature from said copy.

* * * * *